Sept. 20, 1960                L. P. GARVEY ET AL                2,953,188
                                 VEHICLE SEAT
Filed Jan. 28, 1957                                          2 Sheets-Sheet 1

INVENTORS
Louis P. Garvey &
Earl M. Starr
BY
W. S. Pettigrew
ATTORNEY

INVENTORS
Louis P. Garvey, &
Earl M. Starr
BY
W. S. Pettigrew
ATTORNEY

United States Patent Office 2,953,188
Patented Sept. 20, 1960

2,953,188
VEHICLE SEAT

Louis P. Garvey, Birmingham, and Earl M. Starr, Hamtramck, Mich., assignors to General Motors Corporation, Detroit, Mich., a corporation of Delaware Filed Jan. 28, 1957, Ser. No. 636,828

3 Claims. (Cl. 155—5)

This invention relates to vehicle seats and more particularly to swivel type vehicle seats.

The swivel seat of this invention is mounted on the body for rotary movement about a vertical axis between a first position wherein it is intended that the seat face forwardly of the body and a second position wherein it is intended that the seat face outwardly of the body through a door opening therein for occupant exit and entrance. By providing a seat of this type, the occupant can very easily leave the seat or position himself upon the seat regardless of the shape of the door opening or whether the vehicle steering wheel projects over the seat. This is especially important with the advent of wraparound windshields wherein a portion of the windshield and body structure often projects into the front door opening to create an obstruction to entrance and exit of the seat occupant.

The swivel seat of this invention further includes selective power operated horizontal and vertical adjusting mechanisms which are supported on the seat for movement therewith whereby the seat may be adjusted in any rotative position thereof. This allows the occupant of the seat to move the seat to its position facing outwardly of the door opening and to then adjust the seat horizontally outwardly of the body through the door opening and also vertically downwardly within the opening for easier exit and entrance to and from the seat.

Thus, the swivel seat of this invention offers many advantages over present vehicle seats and solves many of the problems attendant with modern automobile styling.

The primary object of this invention is to provide a new and improved swivel type vehicle seat. Another object of this invention is to provide a new and improved swivel type vehicle seat which is movable to various rotative positions and which is selectively horizontally and vertically adjustable in any rotative position thereof. A further object of this invention is to provide new and improved selective power operated horizontal and vertical adjusting mechanisms for vehicle seats. Yet, another object of this invention is to provide new and improved selective horizontal and vertical adjusting mechanisms for swivel type vehicle seats mounted on vehicle bodies for rotary movement about a vertical axis to various rotative positions with respect to the body.

These and other objects of this invention will be readily apparent from the following specification and drawings, in which.

Figure 1:
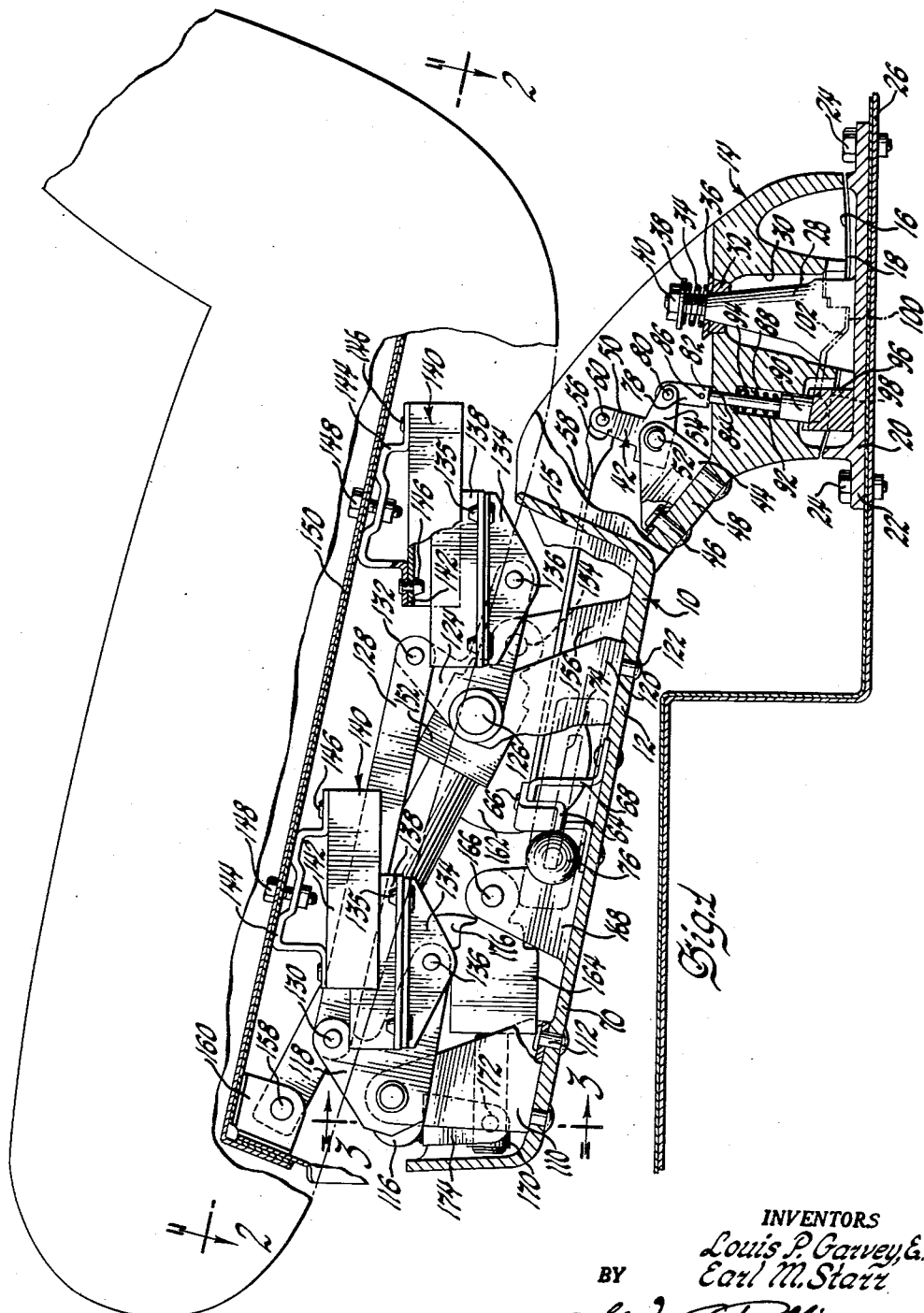
Figure 1 is a side elevational view of a vehicle seat according to this invention with parts thereof broken away for clarity of illustration and with the seat being shown in a normal position facing forwardly of a vehicle body.

Referring now to the drawings, the swivel seat of this invention will be described. A vehicle seat support 10 includes an upwardly opening generally box-shaped housing 12 and a housing support 14 which extends generally rearwardly and downwardly from the rear wall 15 of housing 12. The housing 12 and the housing support 14 may be integral with each other or may be separate and secured together in a suitable manner. The housing support 14 terminates in a continuous circular edge 16 which is symmetrical on opposite sides of the center line thereof and slidably engageable with a continuous circular edge 18 of a base support 20, with edges 16 and 18 being complementary to each other. The base support 20 includes a laterally outwardly extending flange 22 and a number of bolts 24 extending through this flange fixedly secure the base support to the vehicle floor pan 26. An upwardly tapering stud 28 formed integral with the base support 20 is received within an opening 30 in housing 14, with a bushing 32 of anti-friction material being positioned between the stud and the wall of the opening. A compression spring 34 received on the upper terminal end of stud 28 has one end thereof bearing against a washer 36 supported on bushing 32 and the other end thereof bearing against a washer 38 which is located by a nut 40 threaded on the threaded end of stud 28.

Figure 2:
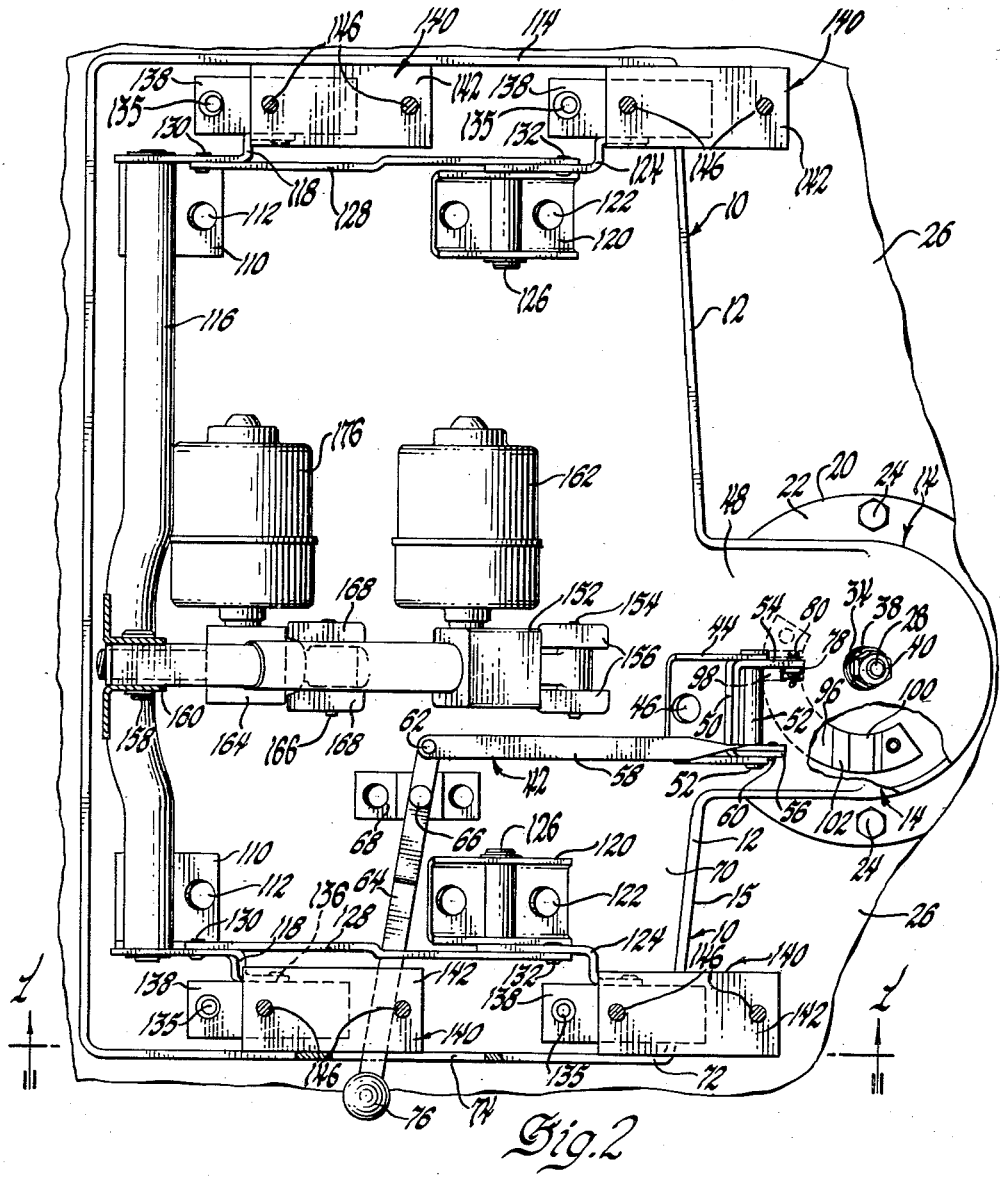
Figure 2 is a view taken on the plane indicated by line 2—2 of Figure 1, with parts thereof broken away for clarity of illustration.

The stud 28 does not extend about a true vertical axis but rather is tilted rearwardly of a true vertical axis approximately two and one-half degrees and is also tilted outboard of the seat relative to the vertical axis for substantially the same number of degrees. Thus, as the seat is turned through an arc of substantially ninety degrees in a counterclockwise direction from its position as shown in Figure 2, the front edge of the seat will swing upwardly and will then swing downwardly as the seat moves to its ninety degree position. It will be noted that the complementary edges 16 of the housing support 14 and 18 of the base support 20 which slidably support the housing support on the base support are complementary to this motion of the seat.

In order to releasably hold the seat in either position thereof a latch mechanism 42 is provided. A U-shaped bracket 44 is fixedly secured at 46 to a forward wall 48 of the housing support 14. A bell crank lever 50 is pivotally secured to bracket 44 at 52 with the inboard and outboard legs 54 and 56, respectively, of the bell crank being at ninety degrees to each other, as may be seen in Figure 1. A link 58 has one end thereof pivotally secured at 60 to the outboard leg 56 of the bell crank and the other end thereof pivotally secured at 62 to a lever 64. The lever 64 is pivotally secured at 66 to a U-shaped bracket 68 welded or otherwise secured to the lower wall 70 of housing 12, and extends outwardly through the outboard side wall 72 of the housing through a rectangularly shaped aperture 74. A ball 76 is secured to the outboard end of the lever for manual operation thereof, as will be described.

A link 78 is pivotally secured at 80 to the inboard leg 54 of bell crank 50. The link terminates in a circular housing 82 which receives one end of a rod 84, with the rod being secured therein by a pin 86. The rod extends through a shouldered aperture 88 in the housing support 14 and terminates in a plunger 90, with a compression spring 92 being located between the plunger 90 and the shoulder 94 of aperture 88 to bias the rod and plunger downwardly with respect to the housing support 14. An upwardly extending rib 96 is formed integral with the base support 20 and is located radially inwardly of the arcuate edge 18 of the support. The rib includes detents 98 and 100 separated by an arc of approximately ninety degrees, with the detent 100 being provided with a tapering side wall 102. It will be noticed that the curvature of the rib 96 generally follows the curvature of the edges 16 and 18 of the housing support and base support, respectively.

When the seat is in its normal position, as shown, the plunger 90 is in engagement with the detent 98 of rib 96 in order to hold the seat in this position against movement in either direction. When it is desired to move the seat from this position to a position located approximately ninety degrees to the normal position, the ball 76 of lever 64 is grasped and the lever is pulled rearwardly or shifted to the right with respect to the aperture 74 in the outboard wall 72 of housing 12. This shifts the lever 64 counterclockwise with respect to pivot 66 and in turn shifts the link 58 forwardly to swing the bell crank 50 counterclockwise about its pivot 52 on bracket 44. As the bell crank shifts counterclockwise link 78 will be shifted upwardly to in turn move plunger 90 upwardly against the action spring 92 so that the plunger will be positioned out of engagement with the detent 98 of the rib 96. Thereafter, as the seat is initially moved to its ninety degree position, the ball 76 is released so that the plunger 90 rides along the rib 96 and into engagement with the detent 100 when the seat reaches its ninety degree position to releasably hold the seat in this position. When the seat is returned to its normal position, the ball 76 need not be grasped since initial movement of the seat towards this position will cause the plunger 90 to ride up the tapered wall 102 of detent 100 to cam the plunger upwardly within aperture 88 and release the plunger from engagement with detent 100. Thereafter, the plunger will ride along rib 96 until it moves into engagement with detent 98 as the seat returns to its normal position.

Referring now particularly to Figures 1 and 2 of the drawings, the selective power operated horizontal and vertical adjusting mechanisms will be described. A pair of brackets 110 are secured at 112 to the lower wall 70 of housing 12 adjacent the inboard and outboard walls 114 and 72, respectively, of the housing. A torque rod 116 is rotatably mounted within brackets 110 and has its opposite ends welded or otherwise secured to front vertical bell cranks 118 so as to provide for simultaneous movement of the bell cranks upon rotational movement of the torque rod with respect to brackets 110. A pair of U-shaped brackets 120 are secured at 122 to the base wall 70 of housing 12 rearwardly of the brackets 110. A bell crank 124 similar to bell crank 118 is pivotally secured at 126 to each of the brackets 120 from movement relative thereto. One leg of each pair of front and rear bell cranks is pivotally interconnected by means of a link 128 which is pivoted at 130 to one of the forward bell cranks 118 and at 132 to one of the rearward bell cranks 124. Thus, as the torque hrod 116 is turned in a counterclockwise direction, as viewed in Figure 1, the front bell cranks 118 will move in the same direction and will shift links 128 forwardly of the seat to in turn move the rear bell cranks 124 counterclockwise about their pivots 126.

An angular bracket 134 is pivotally secured at 136 to the other legs of each of the front and rear bell cranks. Each of the brackets 134 is secured at 135 to the base of the lower channel member 138 of front and rear pairs of slide structures 140. It will be noted that the front pair of slide structures 140 are located vertically above the rear pair of slide structures 140 so that the slide structures are in stepped relationship with respect to each other. An upper channel member 142 is slidably mounted in a suitable manner on the lower channel 138 of each slide structure for linear movement relative thereto. A U-shaped bracket 144, Figure 1, secured at 146 to each of the upper channel members 142 is in turn secured at 148 to the seat frame 150 which supports the seat. An extendible and retractable screw jack 152 has the rear end thereof pivotally secured at 154 to a pair of lugs 156 which extend upwardly from the base wall 70 of housing 12. The forward end of the screw jack is pivotally secured at 158 between the legs of a U-shaped bracket 160 which in turn is secured to the seat frame 150. The screw jack is driven by an electric motor 162.

Upon operation of the electric motor 162 in a direction to extend the screw jack, the seat frame 150 will be moved forwardly as each of the upper channel members 142 of the slide structures move relative to the lower channel members 138. Similarly, if the electric motor is operated in the opposite direction, the seat frame will be moved rearwardly as the upper channels 142 move relative to the lower channels 138. Since each of the slide structures 140 is carried by the bell cranks which provide vertical adjustment of the seat, as will be described, the seat may be horizontally adjusted regardless of the vertical position of the seat. In turn, the screw jack 152 is pivoted at each end thereof to the housing 12 and seat frame 150 as previously described. This allows the screw jack to change its angular relationship with the lower wall 70 of the housing depending on the vertical position of the seat. Thus, the screw jack 152 is operative to horizontally adjust the seat regardless of the vertical position thereof.

Figure 3:
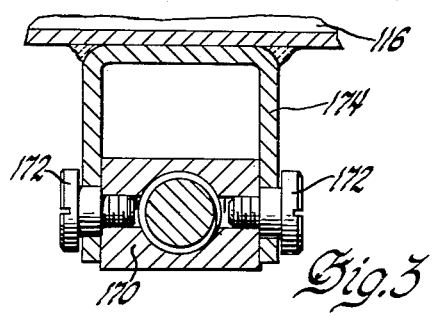
Figure 3 is a sectional view taken on the plane indicated by line 3—3 of Figure 1.

A screw jack 164 similar to screw jack 152 has its rear end thereof pivoted at 166 to a pair of lugs 168 formed integral with the lower wall 70 of housing 12. The forward end of the screw jack includes a nut 170, Figure 3, which is threadedly received by the screw jack and rotatably mounted at 172 between the legs of the U-shaped bracket 174. Bracket 174 is fixedly secured to the torque rod 116 so as to rotatably support the forward end of the screw jack 164 on the torque rod.

The operation of the torque rod 116 has been previously described in conjunction with movement of each of the front pairs of bell cranks 118 and 124. Thus, as the torque rod is rotated in a counterclockwise direction upon operation of the motor 176 in a suitable direction, the front bell cranks 124 will move in the same direction and will in turn move the rear bell cranks in the same direction through the shiftable links 128. As each of the pairs of bell cranks moves in a counterclockwise direction, the seat will be vertically adjusted as the bell cranks shift both the front and rear pairs of slide structures vertically upwardly. Similarly, if the screw jack 164 is operated in the opposite direction to in turn move the torque rod 116 and the bell cranks in the opposite direction, the seat will be vertically lowered as each of the bell cranks lowers each of the slide structures.

Since the horizontal and vertical adjusting mechanisms are carried by the seat housing which in turn is secured to the floor pan for rotary movement relative thereto, it will be noted that the seat may be both horizontally and vertically adjusted regardless of the rotative position of the seat. Thus, if the subject seat is used as the driver's seat of a vehicle, the driver may release the latch to move the seat to its ninety degree position as previously described and then the seat may be moved horizontally forwardly and vertically downwardly at the same time so as to position the seat both outwardly of the door opening and downwardly within the opening to provide for easier exit of the driver. Thereafter, the driver may easily return the seat to its normal position prior to closing of the door.

When the driver returns to the vehicle and has opened the door, he may release the latch and move the seat to its ninety degree position and may then easily position himself within the seat and swing the seat inwardly of the body to its normal position. Thereafter, the seat may be adjusted either horizontally or vertically to the position best suited to the occupant for normal driving.

Thus, this invention provides a new and improved swivel type vehicle seat which is movable to various rotative positions and may be selectively adjusted horizontally or vertically in any rotative position therof. Both the horizontal and vertical adjusting mechanisms of the seat are power operated and have been located so as to be disposed within the seat housing and yet to adequately adjust the seat. It will further be noted that the vertical adjusting mechanism which supports the seat is arranged so that the rear portion of the seat is supported directly on the housing through the rear pairs of bell cranks 124 while the forward portion of the seat is supported on the housing through the torque rod 116 which is rotatably supported by the housing and in turn carries the front bell cranks 118 which support the front portion of the seat.

We claim:

1. In combination with a vehicle body, a vehicle seat support including an upwardly opening recess therein, means rotatably mounting said support on said body for rotational movement about a substantially fixed axis, a vehicle seat positioned above said seat support and including a recess therein opening to said seat support recess, a seat slide structure positioned within said recesses and including a pair of relatively movable members, means operatively securing one of said relatively movable members to said seat within said recess therein, vertical adjustment means mounted on said seat support within said recess therein and operatively secured to the other of said relatively movable members for vertical adjustment of said slide structure and seat regardless of the rotative position of said seat support, power operated means mounted on said seat support and located within said recess, and means operatively securing said power operated means to said one of said relatively movable members for movement of said one of said members and seat relative to said other of said members and seat support regardless of the rotative position of said seat support.

2. In combination with a vehicle body, a vehicle seat support including an upwardly opening recess therein, means rotatably mounting said support on said body for rotational movement about a substantially fixed axis, a vehicle seat positioned above said seat support and including a recess therein opening to said seat support recess, a pair of spaced seat slide structures positioned within said recesses, each pair including a pair of relatively movable members, means operatively securing one of said members of each slide structure to said seat within said recess therein, a pair of spaced vertical adjusting levers mounted on said seat support within said recess therein, each being operatively secured to the other of said members of said slide structures for vertical adjustment of said slide structures and seat regardless of the rotative position of said seat support, power operated means mounted on said seat support and located within said recess, and means operatively securing said power operated means to said ones of said relatively movable members for movement of said ones of said members and seat relative to said others of said members and seat support regardless of the rotative position of said seat support.

3. In combination with a vehicle body, a vehicle seat support including an upwardly opening recess therein, means rotatably mounting said support on said body for rotational movement about a substantially fixed axis, a vehicle seat positioned above said seat support and including a recess therein opening to said seat support recess, a vertically stepped pair of seat slide structures positioned within said recesses, each pair including a pair of relatively movable members, means operatively securing one of said members of each pair to said seat within said recess therein, a vertically stepped pair of vertical adjusting levers mounted on said seat support within said recess therein, each being operatively secured to the other of said members for vertical adjustment of said slide structures and seat regardless of the rotative position of said seat support, power operated means mounted on said seat support and located within said recess, and means operatively securing said power operated means to said ones of said relatively movable members for movement of said ones of said members and seat relative to said others of said members and seat support regardless of the rotative position of said seat support.

References Cited in the file of this patent

UNITED STATES PATENTS

| | | |
|---|---|---|
| 1,470,004 | Gahm | Oct. 9, 1923 |
| 1,899,585 | Nelson et al. | Feb. 28, 1933 |
| 1,903,267 | Roberts | Mar. 28, 1933 |
| 1,921,224 | Floraday | Aug. 8, 1933 |
| 2,242,138 | Muma | May 13, 1941 |
| 2,256,023 | Harmon | Sept. 16, 1941 |
| 2,266,010 | DeVeau | Dec. 16, 1941 |
| 2,641,305 | Oishei | June 9, 1953 |
| 2,681,690 | Johnson et al. | June 22, 1954 |
| 2,789,622 | Dingman et al. | Apr. 23, 1957 |
| 2,839,124 | Desmond et al. | June 17, 1958 |
| 2,864,431 | Eaton | Dec. 16, 1958 |

FOREIGN PATENTS

| | | |
|---|---|---|
| 525,663 | Great Britain | Sept. 2, 1940 |